(12) United States Patent
Hornor

(10) Patent No.: US 10,334,962 B2
(45) Date of Patent: Jul. 2, 2019

(54) WEARABLE PORTABLE BABY CHANGING TABLE

(71) Applicant: Jason Hornor, San Diego, CA (US)

(72) Inventor: Jason Hornor, San Diego, CA (US)

( * ) Notice: Subject to any disclaimer, the term of this patent is extended or adjusted under 35 U.S.C. 154(b) by 254 days.

(21) Appl. No.: 15/217,817

(22) Filed: Jul. 22, 2016

(65) Prior Publication Data

US 2018/0020843 A1    Jan. 25, 2018

(51) Int. Cl.
*A47D 5/00* (2006.01)
*F16M 13/04* (2006.01)

(52) U.S. Cl.
CPC ............ *A47D 5/006* (2013.01); *F16M 13/04* (2013.01)

(58) Field of Classification Search
CPC .......................................................... A47D 5/00
USPC ............................................. 5/655, 947, 632
See application file for complete search history.

(56) References Cited

U.S. PATENT DOCUMENTS

| | | | |
|---|---|---|---|
| 5,938,096 A * | 8/1999 | Sauer | A47B 23/002 190/109 |
| 2013/0167299 A1 * | 7/2013 | Gant | A47D 5/00 5/655 |

* cited by examiner

*Primary Examiner* — Fredrick C Conley
(74) *Attorney, Agent, or Firm* — Donn K. Harms

(57) ABSTRACT

A portable, stable and rigid baby changing station which can be easily collapsed for storage or expanded for use and which can be safely and securely worn by a user, to form a firm bed for changing a baby when no other clean or useable surfaces are available.

15 Claims, 3 Drawing Sheets

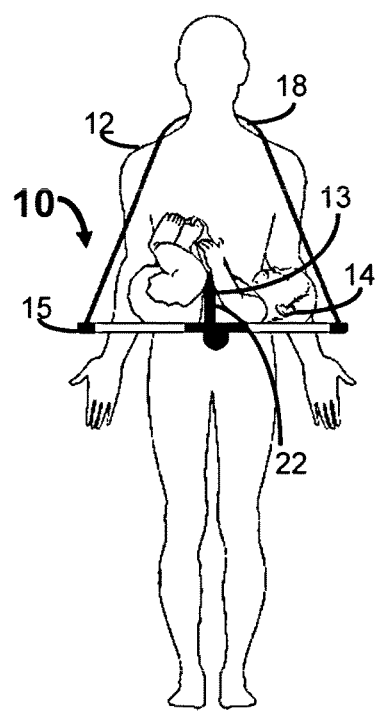
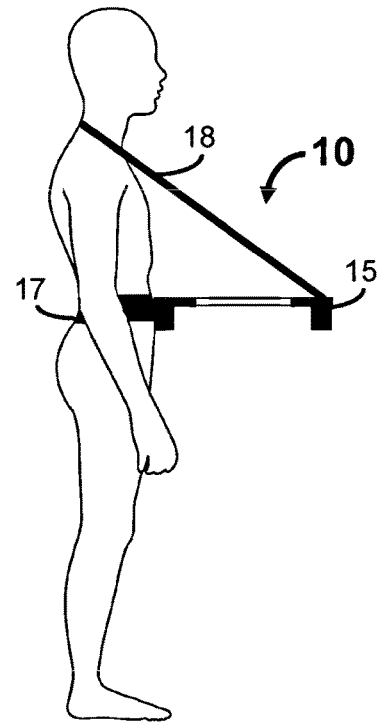
FIG 1
FIG 2
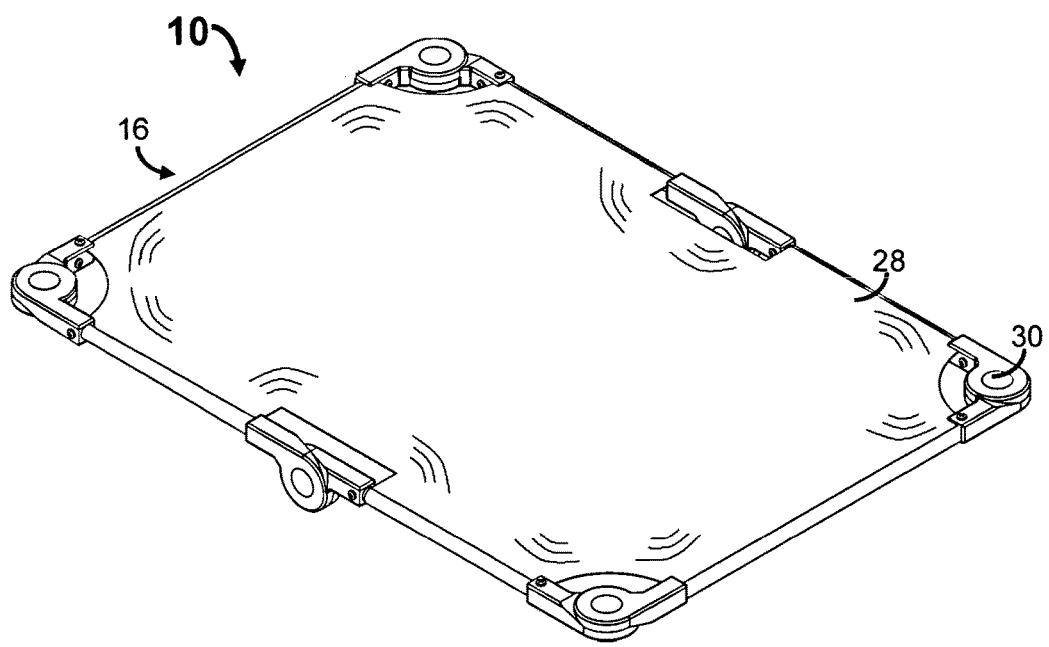
FIG 3

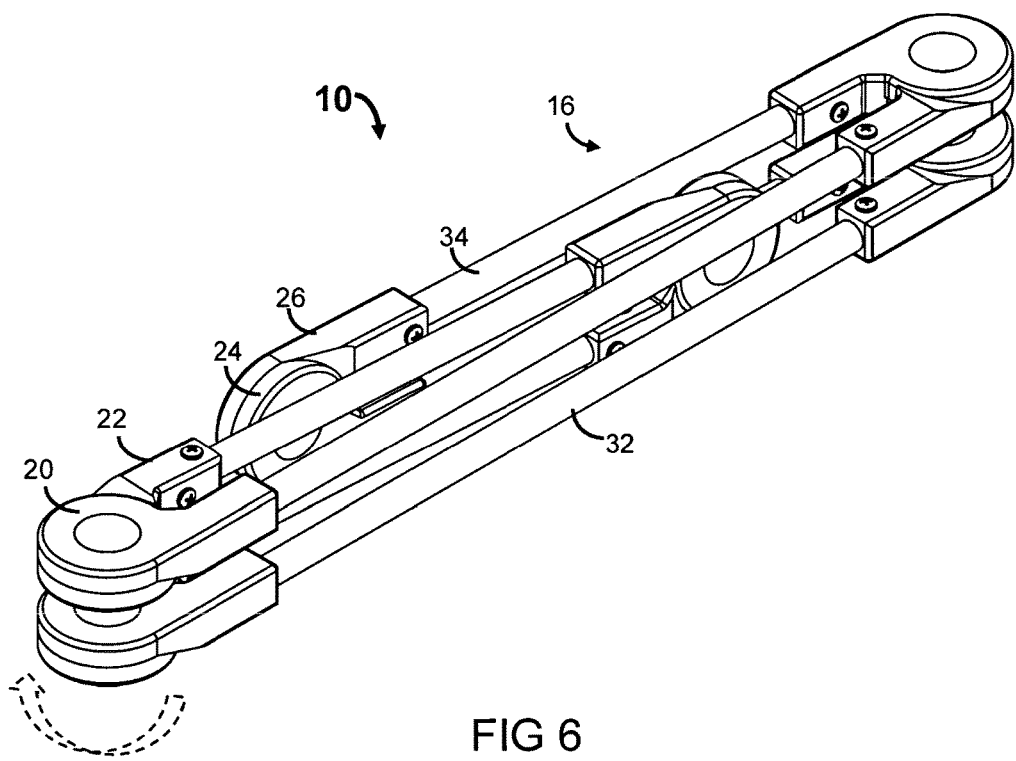
FIG 6
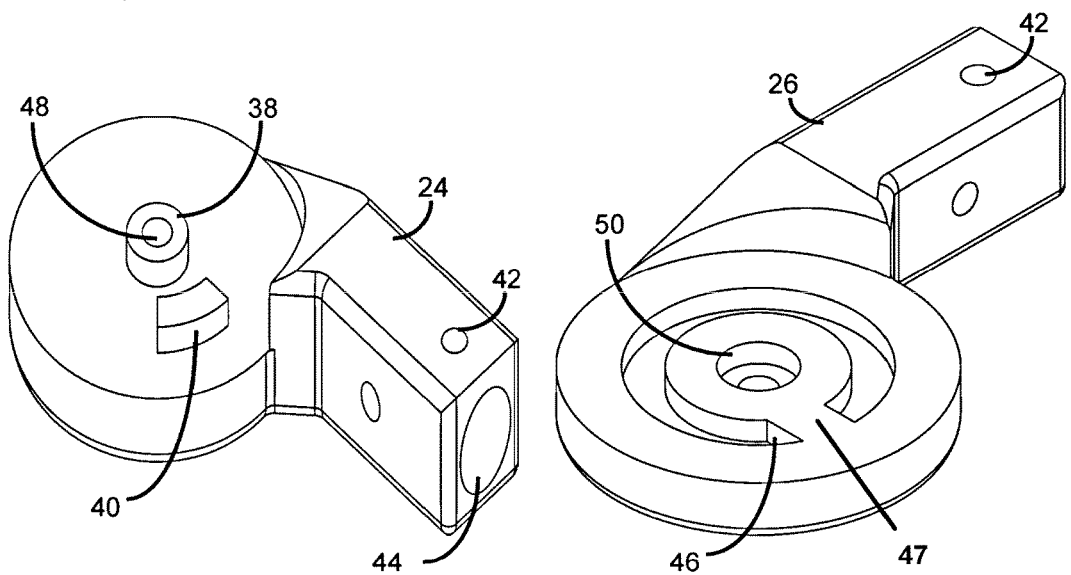
FIG 7
FIG 8

WEARABLE PORTABLE BABY CHANGING TABLE

FIELD OF THE INVENTION

The present invention deals broadly with the field of baby changing stations. More specifically, it relates to a stable, portable platform which can be safely and securely worn by a user, which forms a firm bed for changing a baby when no other clean or useable surfaces are available.

BACKGROUND OF THE INVENTION

Parents and caregivers of infants and young children that wear diapers are frequently obliged to perform diaper changes away from home. Although public restrooms are often the most convenient place to perform a diaper change, many bathrooms, particularly men's restrooms, do not provide a diaper changing station. Further, many public restrooms lack any diaper changing facilities and such public restrooms are frequently unkept and soiled or broken.

As such, when a change of diaper for an infant is required, many parents and caregivers are presented with a dilemma. They may either change the diaper in public on any surface they may find adapted to the task, or to ensure the safety and privacy of their child, they may be forced to employ restroom counters or floors, in less than desirable conditions, to create improvised changing tables.

U.S. publication 20100138995 of Smith teaches a door mountable infant change table. The device as taught by Smith is capable of engaging to a door such as that in a restroom stall and securely supporting a baby during a diaper change. However, the device as taught in Smith is unportable in a primary state of use. Further, the device is non-collapsible and therefor lacking in the ability for easy transportation and non-home use.

U.S. Pat. No. 8,887,335 of A. Gant attempts to improve upon the patent to Smith by teaching a collapsible and portable baby changing device which can be temporarily installed onto and hang from a bathroom door or stall divider. This device, however, can only fasten to doors or board structures with an accommodating and mating height and width. Consequently, as taught it could not, for example, be employed in many park restrooms with thick brick walls and dividers or in single-room restrooms without a divider or a gap above the door to engage.

As such there is a current unmet need for a diaper changing table that is highly portable and extremely compact so as to provide a safe and sanitary surface for performing diaper changes on the go. Such a compact and secure diaper changing device should be configured for easy deployment and easy storage and and should be engageable to a support such as the user, and therefor not reliant on the specific geometry of restroom or private enclosure.

Still further, such a portable baby changing station should be light in weight to easy transport by a user and should be composed of a durable material to allow for constant transport and usage without becoming easily damaged. Additionally, such a changing station device should easily contract to a very small linear configuration for storage and transport, but easily expand and ensure safety and comfort during use.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of the present invention to provide a stable, rigid, portable baby changing station.

It is an additional object of this invention to easily collapsible and expandable changing platform without the need of specialized or generic tools or fasteners.

It is a further object of the present invention to provide a durable changing station which can be worn by the parent or caretaker who is changing the baby which does not have to adhere to any structure.

These and other objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

In accordance with the purposes of the present invention, as embodied and broadly described herein, the present invention provides a means for a safe, collapsible and easily transportable baby changing table. The device is comprised of a platform assembly adapted for support on the body of a user. The device preferably includes a baby waist strap, to secure the baby during changing. Further, the device includes a user waist strap and user neck strap, which allow the user to securely wear the device during use with the weight of a child supported thereon.

The platform assembly includes a collapsible platform frame, which is easily configurable from a collapsed and compact configuration, to a temporarily substantially rigid planar structure. The planar structure in a deployed configuration includes a fabric bed adapted to support a baby during use.

The collapsible platform frame is easily configured between a collapsed configuration and deployed configuration through the inclusion of four pairs engaged male 90-degree hinge components and female 90-degree hinge components, and two pairs of operatively engaged male 180-degree hinge components and female 180-degree hinge components. Operatively engaged hinge pins engage the hinges which are engaged with two primary members and four secondary members forming the platform frame when deployed.

The collapsible platform frame is assembled such that both ends of each primary member connect to a male 90-degree hinge component and so the distal end of each secondary member connects with a female 90-degree hinge component.

The proximal end of both rightmost secondary members connects to a female 180-degree hinge components while the proximal end of both leftmost secondary members connects to a male 180-degree hinge components.

A hinge pin constrains each set of hinges to move in only one rotational direction of freedom with respect to each other. One or more platform fasteners are additionally employed on each hinge for rigid connection with the primary and secondary members, the fabric bed, and the straps.

The device is worn by looping the user neck strap over the head and around the neck of the user and tightening the waist strap about the abdomen or hip of the user. Once properly supported in front of the body of the user, the user then places the infant on a top surface of the collapsible platform. Thereafter the user may secure the baby in place with a provided baby waist strap.

In an alternative method of device use, the user can first lay the baby onto the top surface of the deployed platform while it is supported on a surface. Thereafter they may employ the baby waist strap for safety prior to donning the device by placing the neck strap over their head and tightening the waist strap about their hip or midriff.

In all modes of the device, to minimize the size of the device in a collapsed configuration, first and second folding stages are employed. This allows for an easy change of the device to a highly collapsed configuration which allows for easy transportation and storage in a minimal amount of shortage space.

In moving the device from a deployed configuration of the platform, to the collapsed configuration, the user maneuvers the device into its first folding stage by rotating the leftmost primary member under the rightmost primary member, per the indicated arrow, which rotates both sets of engaged male and female 180-degree hinges about their respective hinge pin and folds the collapsible platform in half.

In the second folding stage of the device which significantly reduces the volume and size of the device to the collapsed configuration, each set of 180-degree hinges and their respective engaged primary members are collapsed inward until they contact the primary or secondary members.

In the preferred mode of the device operative engagement of the 180-degree hinges respectively, is provided by a hollow pin adapted to rotationally engage with a hollow socket are designed to accept the hinge pin. This results in a smooth rotation between both parts.

The male and female 180-degree hinge components engaged to form hinges, additionally include a mating stop pin and stop slot respectively. These operated to prevent the hinges from rotating beyond a relative angle of 180 degrees.

Both sets of 180-degree hinges should be installed within the collapsible platform frame, underneath the engaged fabric platform in a configuration to only fold downwards and away from the top of the fabric bed. This prevents the weight of the baby positioned upon the fabric platform from collapsing the device.

The male and female 90-degree hinge components are operatively engaged using the same pin and hollow socket engagement as the 180-degree hinges. These 90-degree hinges however include a mating stop pin and stop slot which only allows the hinges to rotate up to a relative angle of 90 degrees. Finally, all hinges should contain a mating fastening feature to accommodate the platform fasteners and allow for permanent or temporary adhesion of the fabric bed and the rigidity of the collapsible platform frame.

Although the orientation of the hinge installation in the first preferred mode of the device prevents the collapsible platform from folding under the weight of the baby, a second preferred mode of the device could contain a locking mechanism within the hinges or hinge pin for additional safety.

Alternately designed or currently available hinges with only a fixed range of bidirectional rotation of 90 or 180 degrees, which do or do not contain a locking mechanism can be employed instead of the hinges or hinge pin described in the first preferred mode of the device herein.

The mating fastening feature and platform fasteners within the hinges and platform frame assembly respectively can be any durable and permanent means of attachment including but not limited to: threaded fasteners, rivets, overmolding, bands, ties, buttons or pins. Further, the fabric platform may be sewn in a configuration to hold it operatively upon the formed frame.

Additionally, each member and its respective fixed hinge component can be formed from as a single part.

Alternatively, the fabric bed and the platform frame assembly can contain temporary fasteners to allow for easy cleaning, stowage and transportation.

Additionally, the straps should contain tightening component to maintain a secure connection to the user and baby. Such a tightening component may include but should not limited to any of a group including, cinches, slides, straps, buckles, buttons, clasps, ties, elastics or bands.

The hinges, hinge pins and operatively engaged members in the preferred mode of the device, are preferably formed from a durable water resistant material including but not limited to: plastic, metal, wood, fiberglass, or carbon fiber or other materials as would occur to those skilled in the art.

With respect to the above description, before explaining at least one preferred embodiment of the herein disclosed invention in detail, it is to be understood that the invention is not limited in its application to the details of construction and to the arrangement of the components in the following description or illustrated in the drawings. The device herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other portable, collapsible stands for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

The accompanying drawings, which are incorporated herein and form a part of the specification, illustrate some, but not the only nor exclusive examples of embodiments and/or features of the disclosed device. It is intended that the embodiments and figures disclosed herein are to be considered illustrative of the invention herein, rather than limiting in any fashion. In the drawings:

FIG. 1 depicts an front view of the device in a deployed configuration and operatively supported on the user.

FIG. 2 displays a side view of the device of FIG. 1.

FIG. 3 shows an isometric view of the deployed configuration of the collapsible platform having a fabric support thereon without the straps for clarity.

FIG. 6 depicts an isometric view of the second folded stage of the collapsible platform frame whereby the frame is configured to a collapsed configuration.

Figure 4:
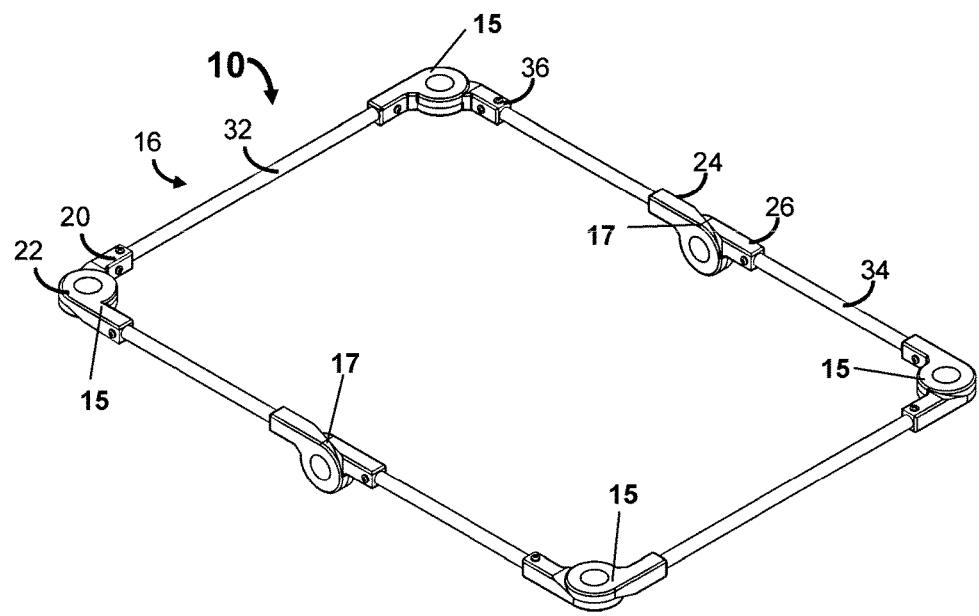
FIG. 4 depicts an isometric view of the collapsible platform frame in the deployed configuration with the fabric support removed.

FIG. 7. shows the male component for a 180 degree hinge per the preferred mode of the device.

FIG. 8. displays the female component for a 180 degree hinge per the preferred mode of the device.

DETAILED DESCRIPTION OF THE INVENTION

Now referring to drawings in FIGS. 1-8, wherein similar components are identified by like reference numerals, there is seen in FIG. 1, the device 10, displayed in its deployed state, operatively supported upon the body of a user 12. As depicted the device 10 includes all of the preferred components required for operation the device 10 in any of the preferred modes described herein, and is adapted to support an infant upon the deployed platform.

The device 10, per FIGS. 1 and 2 comprises a platform assembly 16 which is adapted for support upon the body of the user with a baby or infant supported on a flexible textile or fabric bed 28. A flexible member or waist strap 13 is engageable around the waist of a baby helps to support and maintain the baby 14 on the fabric bed 28 during use. Another flexible member or second waist strap 17 engages the body of the user and another flexible member in the form of a user neck strap 18, both combine to adapt the device 10 for a hanging support upon the body of a user during use such as in FIGS. 1-2.

As shown in FIG. 3, the device 10 in the deployed configuration forms the platform assembly 16. This platform assembly 16 is comprised of a collapsible platform frame 16 which when the device is in the deployed configuration forms a temporarily rigid planar structure to support an engaged flexible fabric bed 28. This fabric bed 28 so supported is adapted to support the baby 14 during use. The device 10 in the deployed configuration of FIG. 3, is collapsible to the collapsed configuration of FIG. 6, as described herein making it easily stored and transported.

In FIG. 4 is shown the platform frame 16 which has a preferred configuration and positioning of engaged hinges enabling it to be moved to the collapsed position of FIG. 6. The platform frame 16 includes four 90-degree rotatable hinges or first hinges 15, with one each positioned at each corner. The first hinges 15 are formed of pairs of first hinge components or male 90-degree hinges 20, and second hinge components or female 90-degree hinges 22, which are in operative rotational engagement to form each first hinge 15 which is configured to allow a 90 degree rotation of the first and second hinge components.

Positioned at central positions on opposing sides of the platform frame 16, are two 180-degree hinges or secondary hinges 17. Each of these secondary hinges 17 are formed by first hinge components or male 180-degree hinges 24, and second hinge components or female 180-degree hinges 26, which are operatively engaged for rotation such as with hinge pins 30 or other means of engagement. The secondary hinges 17 rotate from the deployed configuration in FIG. 4, to a rotated position of FIG. 5, and are engaged to the platform frame 16 in a manner to preferably only rotate away from the fabric bed 28 situated above them such as shown in FIG. 3. This protects the device 10 from collapsing with an infant supported thereon. These secondary hinges 17 are configured for 180 degrees or relative rotation.

Connecting each pair of first hinges 15 which are located at the corners of the platform frame 16, are primary members 32. One side of each first hinge 15 in each pair, is connected to one end of the primary members or members 32.

Connecting each pair of first hinges 15 to the opposing centrally located secondary hinges 17, is a secondary member 34. Each secondary member 34 is connected to one of first or second hinge component on a first hinge 15, and to one of the first or second hinge components of a secondary hinge 17 on an opposite respective end. All connections of the primary members 32 and secondary members 34 to any of the first or secondary hinges may be accomplished with fasteners appropriate to the task. Such fasteners can be any from a group in including pins, screws, rods, adhesive, collared engagements, or other fasteners adapted to the task as would occur to those skilled in the art.

The collapsible platform frame 16 is assembled such that both ends of each primary member 32 connect between two one end of opposing first hinges 15 located on two corners of the platform frame 16 at one end thereof.

As shown in FIG. 4 a hinge pin 30 may be employed to constrain the first and secondary hinge components, and constrain each of the hinges to move in only one rotational direction of freedom with respect to each other. The fabric bed 28 may be sewn with sleeves otherwise engaged to the collapsible platform 16 such as is done with a cot or awning. For example, one or more platform fasteners 36 may be included on one or both sides of each of the first and secondary hinges for connection with the primary and secondary members 32 34, the fabric bed 28, and the straps 17 18.

In operation in the deployed configuration of the device 10 as shown 1 and 2, the device 10 is adapted for support on the body of the user by looping the user neck strap 18 around the neck, and tightening the waist strap 17 about their hip or midriff. The user 12 then places the baby 14 on top of the fabric bed engaged on the collapsible platform 16 and secures the baby in place with the baby waist strap 13.

In an alternative method of device 10 use, the user can first lay the baby 14 onto the collapsible platform frame assembly 16 and employ the baby waist strap 13 for safety before donning the device by placing the neck strap 18 over their head and tightening the waist strap 17 about their hip or midriff.

Figure 5:
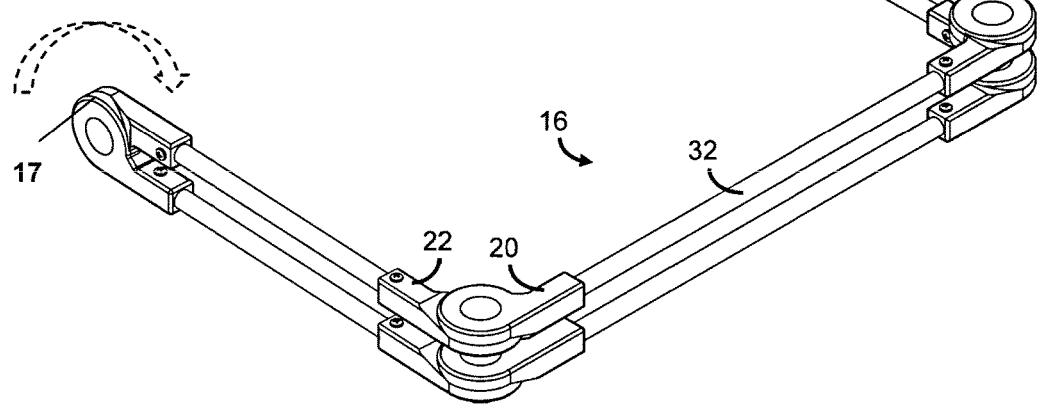
FIG. 5 shows an isometric view of a first folded stage of the collapsible platform frame when reconfiguration from the deployed configuration of FIG. 4 to the collapsed configuration of FIG. 6.

As noted, the device 10 is moved from the deployed configuration using first and second folding stages enabled by the unique positioning of the hinges as displayed in FIGS. 5 and 6 respectively. By positioning the secondary hinges 17 in opposing positions in a center of the platform and first hinges 15 at all corners, the device 10 is easily moved to the collapsed configuration of FIG. 6 for easy transportation and storage.

As shown in FIG. 5, the user 12 maneuvers the device 10 into its first folding stage by rotating the primary member 32 engaged on one end of the platform 16 to a position abutting and the primary member 32 connected between the first hinges 15 at the corners of the opposing side of the platform 16, by rotating both secondary hinges 17 concurrently and thereby folding the collapsible platform 16 in equal halves.

Shown in FIG. 6, is the collapsed configuration of the device 10 achieved in the second folding stage of the device 10, wherein all four of the first hinges 15, are concurrently rotated, thereby collapsing both of the secondary hinges 17 and their engaged respective primary members 34 inward until they abut each other and the primary members 32, and where all of the primary members 32 and secondary members 34 have their respective axis running substantially parallel. By substantially parallel is meant that the axis of the primary members 32 and secondary members 34 are running along lines which are parallel or less than ten degrees off parallel, where the device 10 in the collapsed configuration of FIG. 6, is highly compact.

Shown in FIGS. 7 and 8 display the preferred configuration of the first or male and second or female 180-degree hinge components shown as 24 26 respectively. As shown, a projection or male pin 48 and recess or female hollow socket 50, are adapted to rotationally engaged and accept a hinge pin 30 to maintain operative engagement and allow for smooth rotation between both parts.

The first or male, and second or female 180-degree hinge components 24-26, preferably additionally include a rotation angle limiter formed by a mating stop pin 40 and stop slot 46 and stop 47. As shown, this stop slot 46 engages with the translating stop pin 40 during rotation of the two hinge components. A stop 47 is positioned within the stop slot 46 to cease translation of the stop pin 40 within the stop slot 46 during rotation of the two hinge components and thereby prevent the hinges from rotating beyond a relative angle of 180 degrees.

As noted, preferably both of the secondary hinges 17 should be installed onto the platform frame 16, to fold only in a direction away from the planar fabric bed 28. This configuration prevents the weight of the baby 14 from collapsing the device 10 during use.

The male and female components of the first hinges 15 located at the corners of the platform frame 16 should preferably include the same projection or male pin 48 and a recess or female hollow socket 50. Additionally they should preferably be configured with a mating stop pin 40 and stop slot 46 which has the stop 47 positioned to only allow the 90-degree hinges 15 to rotate up to a relative angle of 90 degrees. Of course the first hinges 15 are self restrained during use from over rotating by the engaged members and will work without inclusion of a rotation angle limiter, however inclusion of such a rotation limiting mechanism is preferred.

Further, all first and secondary hinges in the device 10, may include a mating fastener 42 to accommodate the platform fasteners 36 and allow for permanent or temporary engagement of the fabric bed 28 and the rigidity of the collapsible platform frame 16.

Although the orientation of the first hinges 15 and secondary hinges 17 in the first preferred mode of the device 10 prevents the collapsible platform 16 from folding under the weight of the baby 14, a second preferred mode of the device 10, could include a locking mechanism within the first hinges 15, and secondary hinges 17, or hinge pin 30 for additional safety. Such for example might include a spring loaded hinge pin 30 having a circumference edge on one end, which is adapted to engage both halves of the hinge unless disengaged by depressing the hinge pin 30.

Alternately designed or currently available hinges with only a fixed range of bidirectional rotation of 90 or 180 degrees, which do or do not contain a locking mechanism can be employed instead of the first hinges 15, and secondary hinges 17, or hinge pin 30 described in the first preferred mode of the device 10 herein. However the configuration herein of the first hinges 15 and secondary hinges 17 and their rotation limitations and engagement to members is preferred.

The cooperative engagement between mating fasteners such as with the fastening feature 42 and platform fasteners 36 on the hinges 15 and 17, and platform frame assembly 16 respectively can be any durable and permanent means of attachment including but not limited to those from a group including threadably engaged fasteners, rivets, over molding, bands, ties, buttons or pins.

Additionally, each of the members 32 or 43 and its respective first hinge 15 or secondary hinge 17, can be formed from as a single part.

Alternatively, the fabric bed 28 and the platform frame assembly 16 can contain temporary fasteners to allow for easy cleaning, stowage and transportation. Such might include rings through grommets, sleeves on the fabric bed 28 engageable with the frame, or other means for removable engagement.

Additionally, it is preferred that all of the flexible members forming the straps 13 17 and 18 should be adapted with a tightener to adjust and maintain a secure connection to the user 12 and to the baby 14. Such tighteners can include one or a combination of tighteners from a group including cinches, slides, straps, buckles, buttons, clasps, ties, elastic and bands. All components of the first hinges 15 and secondary hinges 17 and hinge pins 30 and members 32 and 34 in the preferred mode of the device 10, should be made from a durable water resistant material including but not limited to: plastic, metal, wood or carbon fiber.

As noted, any of the different configurations and components can be employed with any other configuration or component shown and described herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A portable diaper changing apparatus, comprising:
   a rectangular platform assembly having a first end opposite a second end and two sides;
   one respective hinge from a group of four corner hinges located in each of four corners of said platform assembly, each said hinge having a first hinge component rotationally engaged to a second hinge component;
   a first primary member having opposing ends thereon, one each of said opposing ends thereof in a respective connection to a respective said first hinge component of each of two opposing said hinges located at said corners at said first end of said platform, and a second primary member having opposing ends thereof, one each of said opposing ends of said second primary member connected to a respective said first hinge component located at said second end of said platform assembly;

secondary hinges positioned in opposing positions substantially centered on both of said two sides of said platform assembly, each secondary hinge having a first hinge component rotationally engaged to a second hinge component;

four secondary members a first of said two sided formed by a first pair of said four secondary members connected at respective first ends thereof to a respective said first hinge component of a said secondary hinge, and connected at respective second ends thereof with a respective said second hinge component of a said hinge located at a said corner located at said first end of said platform, and, a second of said two sides formed by a second pair of said four secondary members connected at respective first ends thereof to a respective said second hinge component of a respective secondary hinge and connected at respective second ends thereof to a respective second hinge component of a said hinge located at a respective corner at said second end of said platform assembly;

a flexible fabric bed engaged on a first side of said platform assembly;

said platform assembly having a deployed position with all of said first and second primary members and said four secondary members positioned in the same plane and holding said fabric bed taught wherein a top surface of said fabric bed is adapted for positioning of an infant thereon and said platform is adapted for hanging support on a user with said first primary member in a contact against said user; and said corner hinges and said secondary hinges rotatable to position said platform assembly to a collapsed position with all of said first and second primary members and said four secondary members adjacent and running substantially parallel to each other.

2. The portable diaper changing apparatus of claim 1 wherein said second hinge component of each of said secondary hinges rotates from an open position thereof with said platform in said deployed position, only in a direction toward said first end of said platform which whereby two half portions of said top surface face each other with said platform assembly in said collapsed position.

3. The portable diaper changing apparatus of claim 2 wherein said first hinges and said secondary hinges rotatable to position said platform assembly to a collapsed position with all of said primary members and secondary members adjacent and running substantially parallel by a rotation of said secondary hinges to first fold said platform assembly in half, and a subsequent concurrent rotation of said four corner hinges positioned at said corners to position all of said primary members and secondary members in said position adjacent and running substantially parallel.

4. The portable diaper changing apparatus of claim 2 further comprising:

each of said secondary hinges having a rotation angle limiter preventing relative rotation between said first hinge component of said secondary hinges and said second hinge component of said secondary hinges to an angle exceeding 180 degrees during movement of said platform assembly to said deployed position from said collapsed position.

5. The portable diaper changing apparatus of claim 4 further comprising:

each of said four corner hinges located in said four corners of said platform assembly having a rotation angle limiter preventing relative rotation between said first hinge component of said hinges and said second hinge component of said hinges to an angle exceeding 90 degrees.

6. The portable diaper changing apparatus of claim 5 further comprising:

a first flexible member having a center portion adapted for engagement around a neck of said user and having ends of said first flexible member respectively connected to said first of said two sides of said platform assembly and said second of said two sides of said platform assembly, and a second flexible member having a central portion thereof adapted for engagement around the waist of said user and having ends thereof connected to a said platform assembly.

7. The portable diaper changing apparatus of claim 2 further comprising:

each of said four corner hinges located in said four corners of said platform assembly having a rotation angle limiter preventing relative rotation between said first hinge component of said hinges and said second hinge component of said hinges to an angle exceeding 90 degrees.

8. The portable diaper changing apparatus of claim 2 further comprising:

a first flexible member having a center portion adapted for engagement around a neck of said user and having ends of said first flexible member respectively connected to said first of said two sides of said platform assembly and said second of said two sides of said platform assembly, and a second flexible member having a central portion thereof adapted for engagement around the waist of said user and having ends thereof connected to a said platform assembly.

9. The portable diaper changing apparatus of claim 1 further comprising:

each of said secondary hinges having a rotation angle limiter preventing relative rotation between said first hinge component of said secondary hinges and said second hinge component of said secondary hinges to an angle exceeding 180 degrees during movement of said platform assembly to said deployed position from said collapsed position.

10. The portable diaper changing apparatus of claim 1 further comprising:

a first flexible member having a center portion adapted for engagement around a neck of said user and having ends of said first flexible member respectively connected to said first of said two sides of said platform assembly and said second of said two sides of said platform assembly, and a second flexible member having a central portion therof adapted for engagement around the waist of said user and having ends thereof connected to a said platform assembly.

11. The portable diaper changing apparatus of claim 9 further comprising:

a first flexible member having a center portion adapted for engagement around a neck of said user and having ends of said first flexible member respectively connected to said first of said two sides of said platform assembly and said second of said two sides of said platform assembly, and a second flexible member having a central portion thereof adapted for engagement around the waist of said user and having ends thereof connected to a said platform assembly.

12. The portable diaper changing apparatus of claim 9 further comprising:
   each of said four corner hinges located in said four corners of said platform assembly having a rotation angle limiter preventing relative rotation between said first hinge component of said hinges and said second hinge component of said hinges to an angle exceeding 90 degrees.

13. The portable diaper changing apparatus of claim 12 further comprising:
   a first flexible member having a center portion adapted for engagement around a neck of said user and having ends of said first flexible member respectively connected to said first of said two sides of said platform assembly and said second of said two sides of said platform assembly, and
   a second flexible member having a central portion thereof adapted for engagement around the waist of said user and having ends thereof connected to a said platform assembly.

14. The portable diaper changing apparatus of claim 1 further comprising:
   each of said four corner hinges located in said four corners of said platform assembly having a rotation angle limiter preventing relative rotation between said first hinge component of said hinges and said second hinge component of said hinges to an angle exceeding 90 degrees.

15. The portable diaper changing apparatus of claim 1 further comprising:
   a first flexible member having a center portion adapted for engagement around a neck of said user and having ends of said first flexible member respectively connected to said first of said two sides of said platform assembly and said second of said two sides of said platform assembly, and
   a second flexible member having a central portion thereof adapted for engagement around the waist of said user and having ends thereof connected to a said platform assembly.

* * * * *